United States Patent [19]
Howard et al.

[11] 3,917,082
[45] Nov. 4, 1975

[54] DESTACKING APPARATUS

[75] Inventors: Richard W. Howard, Forest Lake Township, Washington County; Roman J. Weier, North St. Paul, both of Minn.

[73] Assignee: Wyard Industries, Inc., Forest Lake, Minn.

[22] Filed: Nov. 2, 1973

[21] Appl. No.: 412,111

Related U.S. Application Data

[62] Division of Ser. No. 299,948, Oct. 24, 1972, Pat. No. 3,831,733.

[52] U.S. Cl. .............................. 214/8.5 D; 214/6 S
[51] Int. Cl.² ........................................ B65G 59/04
[58] Field of Search..... 214/8.5 D, 8.5 C, 89, 8.5 A, 214/6 H, 6 S

[56] References Cited
UNITED STATES PATENTS

| | | | |
|---|---|---|---|
| 1,863,465 | 6/1932 | Borrowdale | 271/217 |
| 3,534,872 | 10/1970 | Roth | 214/8.5 C |
| 3,647,092 | 3/1972 | Bulat | 214/6 S |
| 3,780,884 | 12/1973 | Jones | 214/8.5 D |
| 3,782,562 | 1/1974 | Burt | 214/8.5 F |

*Primary Examiner*—Frank E. Werner
*Assistant Examiner*—George F. Abraham
*Attorney, Agent, or Firm*—John C. Barnes

[57] ABSTRACT

An apparatus for the destacking of containers arranged in a plurality of stacked tiers, each tier containing a plurality of said containers. The apparatus lifts the stack to a position where the top tier is held in place while the stack is again lowered. A plate is placed under the separated tier of containers, the tier is then released to the plate and the plate is moved out of the path of the stack. The separated tier is then moved onto a conveyor. The containers as they move onto the conveyor are separated and directed to a transversely moving conveyor in spaced relation where they are oriented with the containers all spaced and all of the containers in the same position.

4 Claims, 9 Drawing Figures

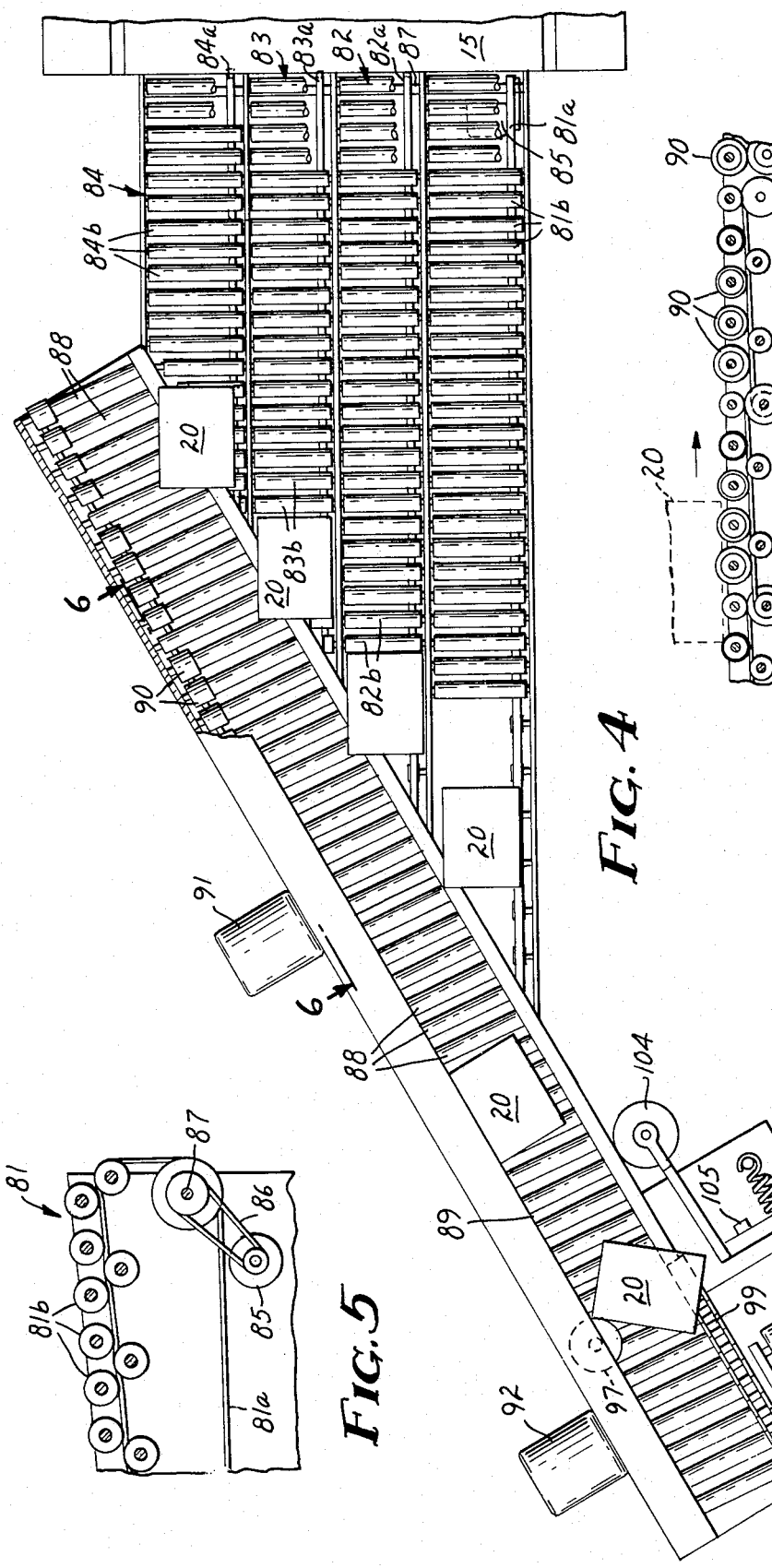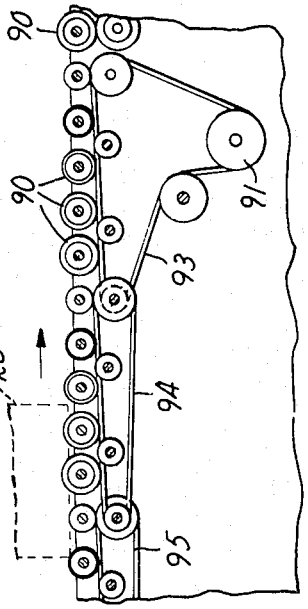

DESTACKING APPARATUS

This is a division of application Ser. No. 299,948, filed Oct. 24, 1972, now U.S. Pat. No. 3,831,733.

BACKGROUND OF THE INVENTION

1. Field of the Invention

This invention relates to a destacking or depalletizing apparatus and to improvements in such apparatus to maintain a continuous flow of containers from said device with the containers spaced and oriented in a predetermined position.

2. Description of the Prior Art

Depalletizing and destacking devices are well known in the patent art. These devices are utilized to separate cartons, bags, boxes, i.e., containers positioned in tiers with the tiers arranged in a stack. Several of the devices have utilized various methods for supporting the articles within a tier and then to physically carry the tier from the top of the stack to a device which would then separate the containers. One such patent is U.S. Pat. No. 3,534,872, issued to Ross et al. A second patent showing another method in which the containers may be removed from the stack is U.S. Pat. No. 2,841,433, issued to Pagdin et al.

The first-mentioned patent utilizes a hoist to raise the stack of containers to a predetermined position. A carriage is then lowered so that opposed gripper pads are brought to the elevation of the top layer of cases. The pads grip the tier of containers. The carriage is then moved from the position above the stack to a position over a table of rollers. The cases are driven from the table of rollers past an accelerating roll which places then upon discharge rollers 62 to establish a space relative to the next following row of cases. This is achieved by the use of a gate bar which holds the following row of cases until the first row has passed off the roller 62. This device has several inherent disadvantages. First, the carriage which is moving the tier of cases is a rather heavy piece of machinery, including a frame upon which is mounted a motor and the pads which grab the cases and the support wheels for the same. The inside cases in a tier are supported only from adjacent cases. The cases are then placed upon a conveyor from which they are advanced incrementally onto a conveyor positioned perpendicular thereto, thus requiring one row of boxes to wait for the preceding row to move out of the way before entry onto the final conveying means.

The second mentioned U.S. Pat, No. 2,841,433, discloses an apparatus where a movable suction head lifts the tiers from a pallet and moves them to a position over a table upon which the entire tier is deposited. The deposited tier is then moved to the rear of the table 12. In this device the discharge is handled row by row, one at a time with stop members being interposed into the path of the second and subsequent rows to stop their movement until a preceding row has been discharged from the table. Means may then be provided for turning the units so that all units discharged will be similarly oriented. In this device the movement of the tier of cases relies heavily upon the success of the suction head grasping a tier of cases for lifting movement from the stack and transfer thereof to the table. The bottoms of the cases are unsupported during movement from the stack. In the event of some bad cases the entire tier may thus be dropped. Again the boxes do not flow from their position off a stack until the final conveyor in an uninterrupted flow of cases from the destacking device.

SUMMARY OF THE INVENTION

The present invention provides a device where the cases in a tier are never spaced in any appreciable relation from a support and they are always supported from the bottom during movement by means which avoid the possibility of the loss of a container even if the same should be damaged, have a hole extending therethrough, or the containers in the tier may not be closely packed. The present invention provides an improved tier separating mechanism. The containers are continuously moving and successive rows of containers in a tier move off the support table to position the containers along a transport conveyor in a uniformly spaced and oriented manner.

The destacking device of the present invention comprises a vertically movable hoist for raising and lowering a stack of containers, a suction head position in a fixed position above said hoist, and clamping bars disposed in the plane below the suction head grasp the containers on all sides of the tier to crowd the same together and hold a tier. One of the bars is a gate mounted adjacent the hood for reciprocation in a plane generally parallel to the path of the hoist to engage one side of a tier. A plate means moves into the path of the stack to a position beneath a tier of containers. With the plate positioned beneath a tier of containers the bars and suction head release the tier and one of the clamping bars, the gate, is moved out of the path of the plate to permit the tier to be moved out of the path of the hoist. A bar is used to slide the containers from the plate onto separating conveyors. The separating conveyors comprise a plurality of parallely extending conveyors of varying length from one end of a row of boxes in the tier to the other. The conveyors having the longer length are driven at a greater speed than the shorter conveyors and discharge containers moved thereon to a transversely positioned conveyor. The transverse conveyor is positioned at the end of each of the separating conveyors and is positioned preferably at an angle of 30° with the direction of the separating conveyors. Conventional means are provided on the discharge conveyor for orienting the containers but the same have been spaced by the separating conveyors and by the variable speed of the conveying rollers of the discharge conveyor such that containers may be rotated 90° without interfering with the movement of preceding or following containers.

BRIEF DESCRIPTION OF THE DRAWING

The present invention will be more fully understood after reading the following detailed description of the invention which refers to the accompanying drawing wherein:

FIG. 4 is an enlarged plan view of the separating device of the destacking apparatus of FIG. 1 with same parts broken away to show hidden parts;

FIG. 5 is a detail view of the drive for the separation rollers;

FIG. 6 is a fragmentary detail view of the drive for the discharge conveyor taken approximately along 6—6 of FIG. 4;

DETAILED DESCRIPTION OF THE PREFERRED EMBODIMENT

Figures 1, 2:
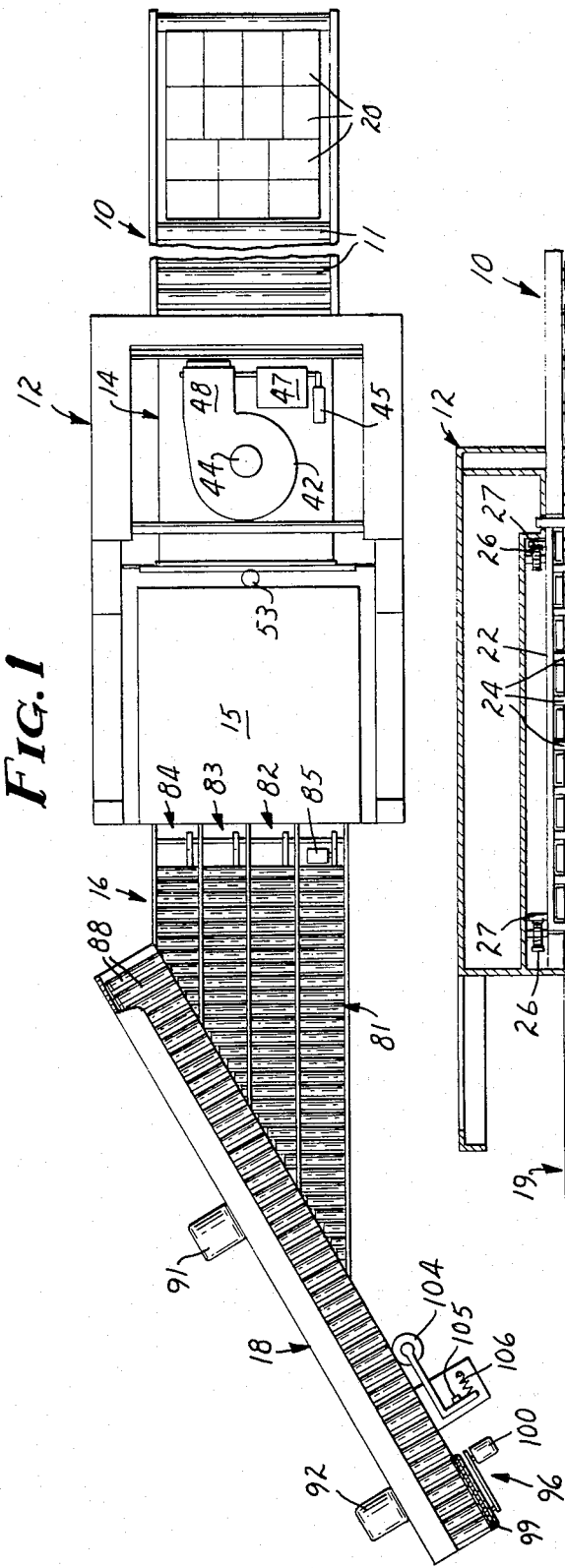
FIG. 1 is a plan view of the destacking device of the present invention.
FIG. 2 is a horizontal sectional view of the hoist of the device of FIG. 1.
Figure 3:
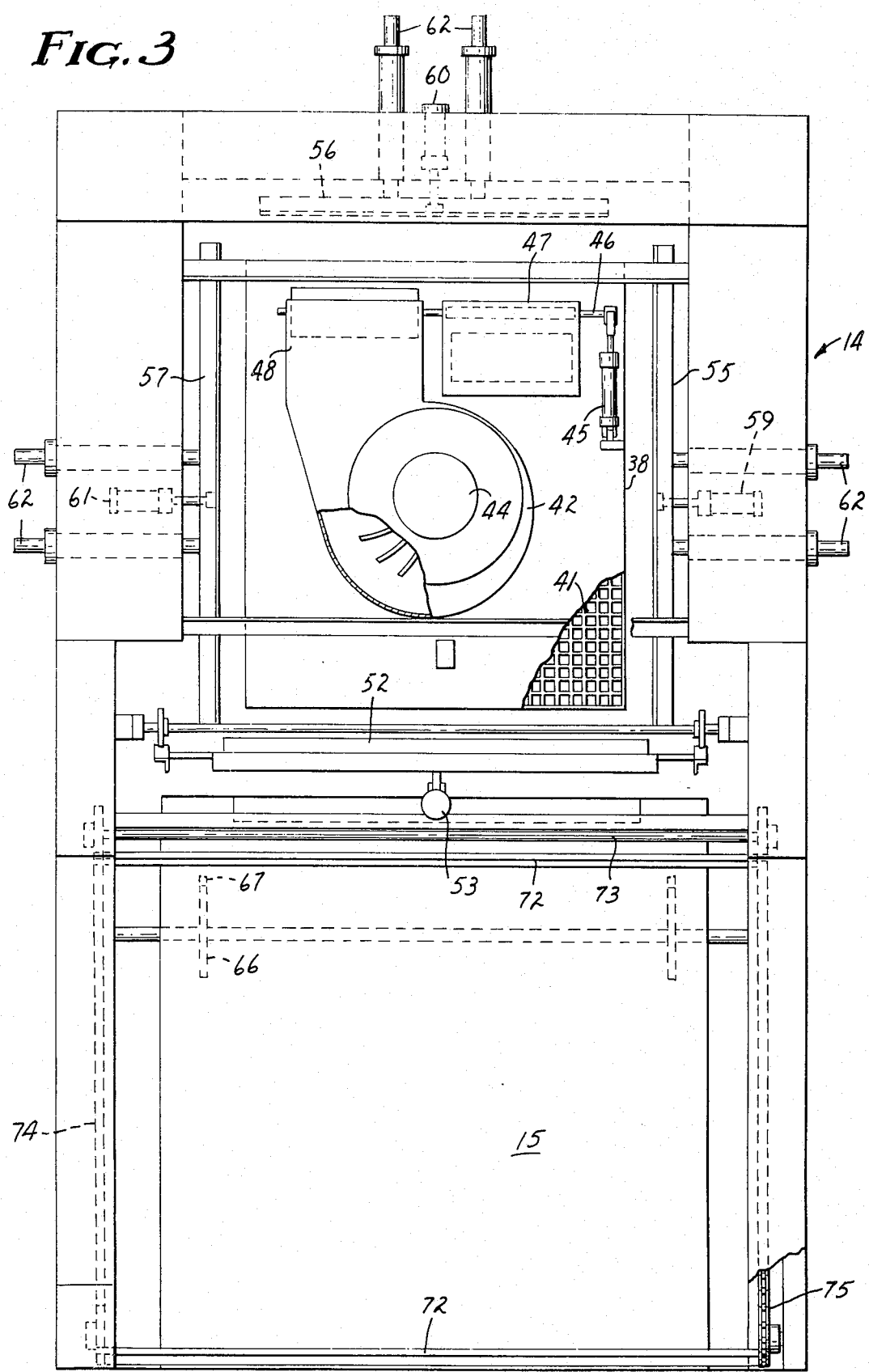
FIg. 3 is an enlarged plan view of the tier separating portion of the destacking device of FIG. 1.

The destacking device of the present invention is adapted to be placed at the receiving end of a transport conveyor 10. This conveyor is adapted to receive a pallet stacked with containers in a plurality of tiers or to receive merely a stack of containers. The conveyor comprises a plurality of uniformly driven rollers 11 positioned together closely to prevent the tipping of the containers or of a pallet. The conveyor 10 moves the stack into position at the base of a tower 12. The tower is formed of suitable frame members to support a 4 point lift hoist generally designated by the numeral 13. Disposed in a fixed position above the hoist at the top of the tower 12 is a tier supporting means generally designated 14 for moving the tiers one at a time from the hoist. The tier supporting means 14 affords the separation of each tier of containers from the stack and places them upon a discharge plate 15. From the plate 15 the containers are moved onto a group of separating rollers generally indicated by reference numeral 16 from which they are placed on a discharge conveyor generally designated 18. On the discharge conveyor 18 is a device which is known in the art for orienting the boxes to place them all in a uniform position on the discharge conveyor.

Figure 7:
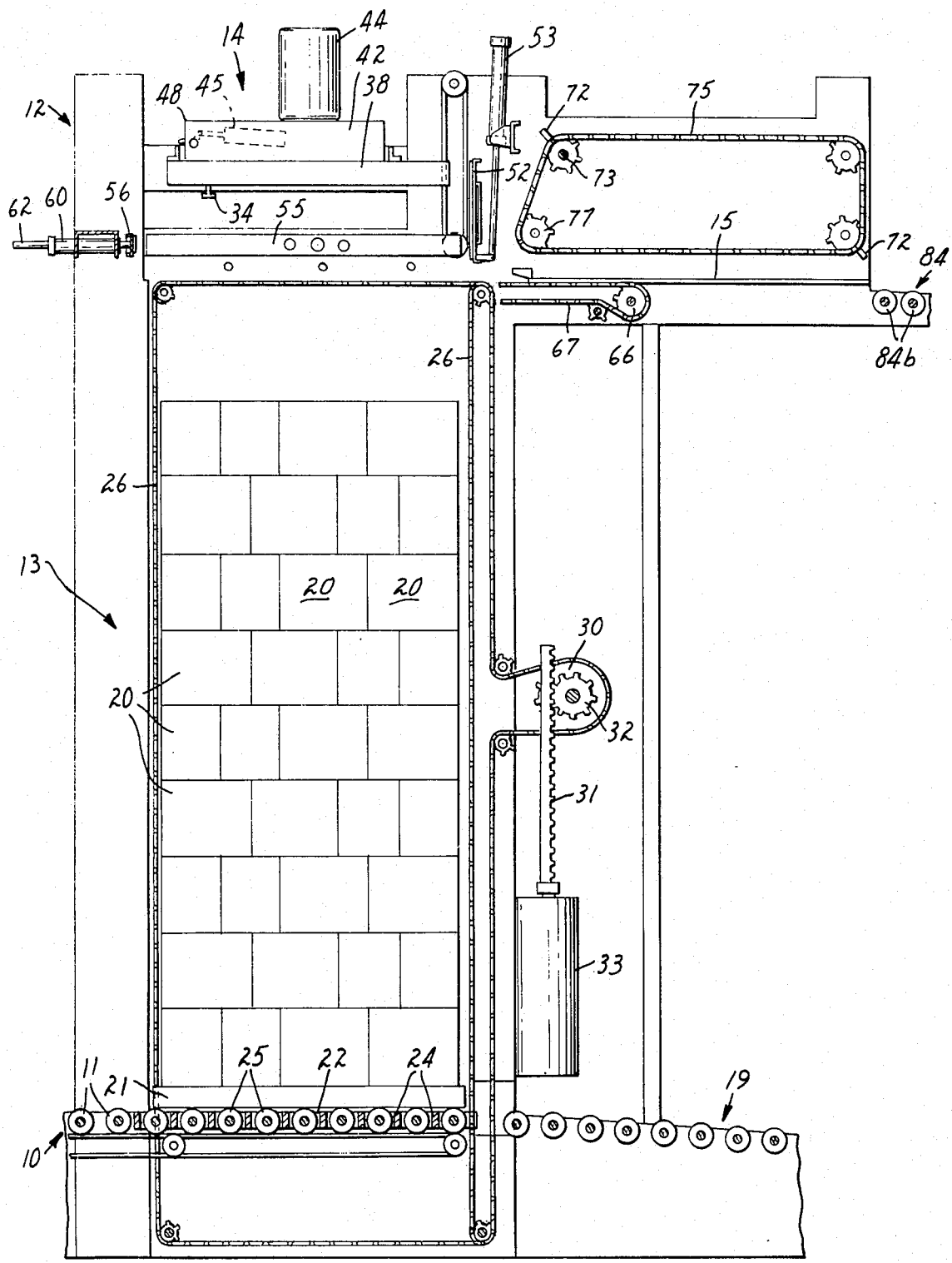
FIG. 7 is a vertical sectional view showing the tier separating device of the present invention.
Figure 8:
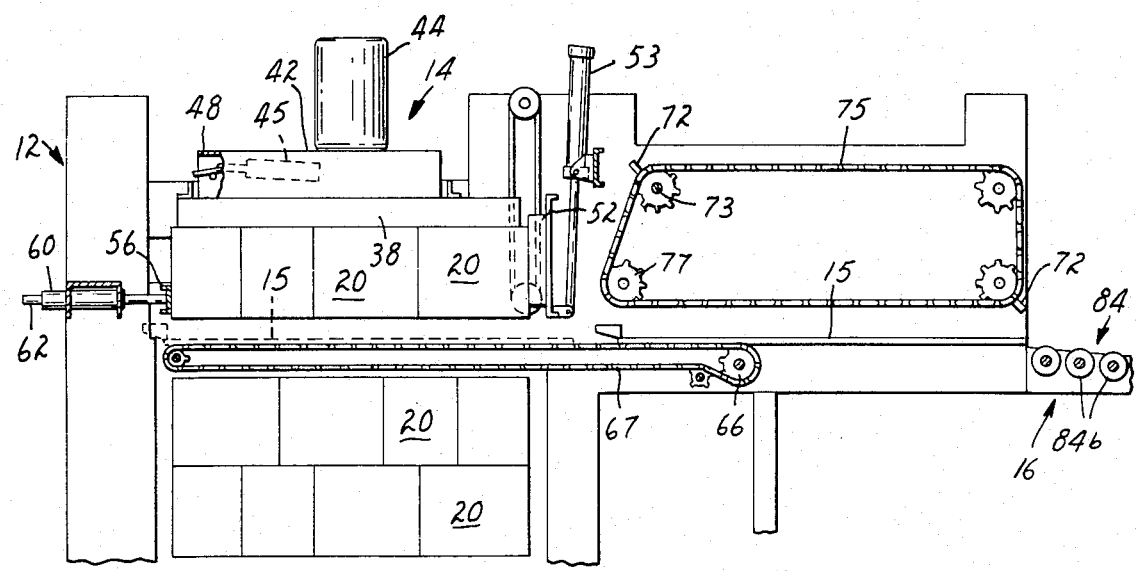
FIGS. 8 and 9 are schematic vertical sectional views illustrating the flow of containers through the destacking device.

In the illustrated embodiment a tier is made up of four rows including a total of fourteen rectangular containers 20. Other patterns of 7, 8, 10, containers, etc., can be destacked with the device of this invention. The tower 12 is tall enough to receive a stack of nine or ten tiers. The stack of containers 20 is disposed on a pallet 21 as seen in FIG. 5. The pallet 21 after being emptied and the hoist 13 returned to its lowermost position, will be driven off of the hoist to the right, as seen in FIG. 7, to a conveyor 19 to be discharged from the tower 12.

The hoist 13 comprises a platform having members forming a rectangular frame 22. Extending between opposed side frame members of the platform are spaced parallel bars 24. The bars 24 are spaced sufficiently to fit on either side of driven rollers 25 forming a part of the continuing conveyor for moving the pallet 21 into position in the tower 12. These rollers 25 can be driven conventionally by a belt disposed beneath the rollers in a manner well known and partially illustrated in FIG. 7. The frame 22 is raised and lowered by a set of chains and each set of chains has a length 26 extending vertically in the four corners of the tower 12. The chains are connected to the frame 22 by brackets 27, and the chains are driven about sprockets by hoist 13 to raise the hoist and lower the frame 22. The chains are wound on a drum 30 which is driven by a rack 31 engaging a pinion 32 and the rack 31 is driven, reciprocated, by a hydraulic cylinder 33 as seen in FIG. 7. The hydraulic cylinder 33 is driven in increments such that it will rotate the drum 30 to lift the hoist 13 until the top tier of containers engages a sensing device 34 depending from beneath the tier supporting means. This degree of movement is controlled by the sensing device 34 being moved upwardly upon engagement with a container 20. The control will then operate in response to a predetermined time cycle as determined by a cam timer, not shown, and the cylinder 33 will lower the hoist 13 a predetermined extent as will hereinafter be described. The drum 30 and pinion 32 are joined by suitable drive couplings to incrementally raise and to selectively lower the frame 22.

As the hoist 13 moves the stack upwardly in the tower 12 large pivoted plates extending upwardly on opposite sides of the stack may pivot at the lower portion of the tower inwardly toward the stack to crowd the containers in the tiers and maintain the stack in a good order. These plates are not illustrated in the accompanying drawings.

As the stack of containers 20 is driven upwardly the uppermost tier will engage the sensing device 34 moving it upwardly to a position flush with a grill of a hood 38 of the tier supporting means 14. A suction or subatmospheric pressure is created in the hood 38 and the tier supporting means further comprises clamping means which engage at least two sides of the tier of containers 20, the sides adjacent the plates of the tower, to crowd the containers together in the other directions. Preferably, as will be described, the containers are crowded together by clamping means engaging each of the four sides. The hood 38 is part of a suction head means which comprises the hood 38, a perforate plate or grill 41 disposed on the lower side thereof and a large centrifugal blower 42, the inlet to which blower communicates with the hood. The blower 42 is driven by a motor 44 mounted above the casing for the blower 42. Operation of the suction of the suction head is controlled by an air motor 45 connected to a rotatable shaft 46 upon which are secured axially spaced and circumferentially rotated baffles which cooperate with an intake 47 which permits air to be drawn into the hood 38 and blower 42 from the top side, and a discharge manifold 48 permitting a rapid rise in the pressure above the grill 41 upon operation of the motor 45 to move the baffles secured to the shaft 46 between their two set positions. Operation of the sensing device thus starts the timer which first operates the motor 45 to close the baffle over the intake 47 and to drawn a suction above the grill 41. The motor 44 is continuously driven.

The clamp means which is disposed in a plane below the grill 41 is operated to crowd the containers 20 in a tier closely together such that a vacuum can effectively be drawn onto the tops of the containers to hold them against the bottom of the grill 41. This clamping means comprises extended opposed bar means which move toward each other under pressure. The bars means comprises a first reciprocating gate 52 which moves in a path in response to operation of a reciprocating air motor or ram 53 to a position along and below one side of the hood 38. As the gate 52 moves downwardly it is cammed also in a direction toward the center of the hood 38. Disposed in a similar plane then are three reciprocating bars 55, 56, 57. These bars are mounted for reciprocating movement under the force of rams 59, 60 and 61, respectively. To control the movement of the bars, the bars are each provided with a pair of arms 62 which are received in sleeves to prevent the bars from being cocked as they are forced against the sides of the tier to crowd the containers together and against the face of the gate 52. Upon actuation of the control timer by the sensing device 34 the gate 52 is in place, and the bars 55, 56, and 57 are actuated to crowd the containers 20 together, the ram 45 energizes the suction head and the rams 33 will subsequently be driven to lower the hoist 12. The hoist is lowered approximately 4 inches to permit the insertion of the reciprocating plate 15 beneath the tier of containers 20 supported against the grill 41.

Sensing devices are disposed about the hood 38 in a plane disposed below the bars 55, 56, and 57, in a position to be also in a plane below that of the bottoms of the containers 20. These sensing devices are electric eyes and photocells which are positioned to detect whether or not a flap or object from one of the containers 20 is hanging below the plane normal for the bottom of a tier. If one of these sensors detects the presence of an object in its path then the control will interrupt the movement of the plate 15 until an operator operates a manual override in the control system to drive the plate or moves the flap, etc., necessary to permit re-energization of the control unit. If the sensors indicate that all is okay with the tier of containers supported against the grill 41, a drive is energized to rotate a pair of sprocket wheels 66 which drive a chain 67 connected to the plate 15 and which chains reciprocate the plate along a predetermined horizontal path. The movement of the plate 15 is directed and guided by a series of rollers engaging tracks such that the plate moves easily under the force of the chain with the same empty or with it loaded with the containers 20 in a tier. The plate 15 is movable under the gate 52 and under the tier of containers 20. After the plate has reached a predetermined position the rams 59, 60, and 61 are retracted from the boxes and the ram 45 is driven to rotate the baffles breaking the suction above the grill 41. The containers 20 are now allowed to drop upon the upper surface of the plate 15. The ram 53 is operated to raise the gate 52 to an upper position. The drive mechanism for the sprocket wheel 66 is actuated in the reverse to reverse the direction of the chain 67 driving the plate 15 normal to the path of the stack, moving the tier of containers to a position spaced from the tower 12. The tier of containers on plate 15 has now been positioned in a position where the rows of containers forming the tier may be separated and the containers placed into a file on the discharge conveyor 18.

Figure 9:
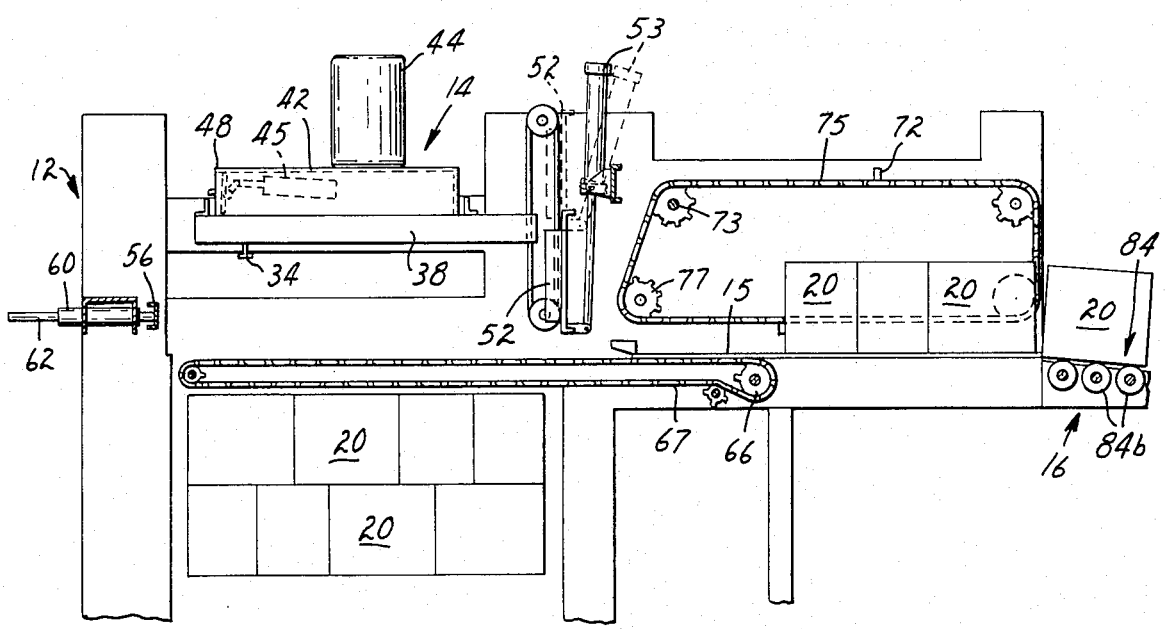

The containers are pushed from the plate 15 by a pusher bar 72. The push bar 72 is supported between a pair of spaced endless chains 74 and 75. The chains 74 and 75 are supported by frames extending upwardly about the opposite sides of the plate 15. These frames support a plurality of transverse shafts which have sprockets supporting the pair of chains 74 and 75. The chains 74 and 75 are connected by two pusher bars 72 extending between the chains. One of the shafts, a shaft 73, supporting one set of sprockets is driven to advance a pusher bar 72 over the surface of the plate 15 to slide the containers 20 thereon off the plate and toward the separating conveyors 16. The movement of the pusher bar 72 engaging a tier is continuous after the plate 15 is in the position of FIG. 9 with the containers 20 moved in advance of a set of sprockets 77. After the last row of containers in a tier has moved onto the separating conveyor 16, the drive to shaft 73 is interrupted. The plate 15 is then moved into the path of the stack to receive another tier of boxes and advance the same through the gate 52 to a position forward of a pusher bar 72 which is timed to be placed behind the next tier moved from the stack.

The separating conveyor 16 comprises four parallel conveying sections 81, 82, 83, and 84. The conveyors are roller conveyors driven in a conventional manner by endless belts 81a, 82a, 83a and 84a extending beneath the parallel rollers 81b, 82b, 83b and 84b, respectively, of each conveyor. The rollers 81b on the longer conveyor 81 are driven by engagement with the cooperating drive belt 81a driven from a smaller diameter pulley on a power shaft 87 from a motor 85 by a belt 86. The belt 81a is driven at a rate which is higher than that of the adjacent belt 82a in the conveyor 82. The rollers 82b of conveyor 82 are driven by the belt 82a trained about and driven from a pulley on shaft 87 which is larger than the pulley driving rollers 81b of conveyor 81 but smaller than the pulley driving the belt 83a and rollers 83b of conveyor 83. Likewise the pulley driving belt 84a which engages the rollers 84b of the conveyor 84 is the largest pulley on the power shaft 87. The fact the rollers of the different conveyors are driven at different speeds causes containers placed thereon to be moved in the direction of the conveyors at different speeds. It is essential that the containers move along the longest conveyor 81 at the greatest rate such that they will reach the discharge conveyor 18 and move therealong before the containers moving on the other conveyor sections 82, 83, and 84 reach the discharge conveyor. It is desirable that the containers 20 reach the conveyor 18 at slightly different times with the container 20 on the longest conveyor 81 reaching first. The container of the subsequent row which is discharged onto conveyor 81 does not reach the conveyor 18 however until the previous container 20 on the shortest conveyor 84 moves along conveyor 18 past the end of the longest conveyor 81.

As a container is moved from the separating conveyors onto the discharge conveyor 18, the rollers forming the discharge conveyor 18 pick up the container. The rollers 88 of the discharge conveyor are positioned at an angle, of preferably 4° with respect to the perpendicular of the direction of movement of the discharge conveyor 18 such that the containers 20 received from the separating conveyors will tend to be driven by the rollers 88 against a side board 89. The rollers 88 are divided into groups of five and each group of five rollers 18 are driven from a separate belt and each of said five rollers are driven at a different speed and at a speed exceeding that of the preceding roller of the group and of the rollers of a subsequent group of five rollers such that as the containers reach the discharge conveyor 18 they are accelerated along the conveyor 18 to further space the containers. In this way the containers move out of the way of the containers of the next row that are being pushed off the plate 15 by the pusher bars 72. The rollers 88 are driven by V-belts engaging the lower periphery of the rollers in a conventional manner but a separate belt drives each group of five rollers. Four rollers out of each group have sleeves 90 over the rollers which sleeves are engaged by the belts. The four sleeves 90 in one group each have a different radical thickness to vary the rotational velocity and increase the linear conveying speed of the roller. The belts are driven from the motors 91 and 92 as with belt 93 in FIG. 6 or from successive jack shafts with the belts 94 and 95 moving slower than the belt 93.

As best illustrated in FIG. 4, a conventional orienting mechanism 96 is disposed along the path of the discharge conveyor 18. This device comprises an abutment wheel 97 which projects from the sideboard 89 into the path of the oncoming container. Opposite the abutment wheel 97, which is free to rotate but is not driven, is a chain 99. The chain 99 is a motorcycle roller chain driven by a belt from a motor 100. The chain 99 is trained about drive sprockets and the upper surface is disposed about one-quarter inch above the surface of rollers 88 and is driven at twice the speed of the adjacent rollers 88. A guide roller 104 which is urged against a stop 105 to a fixed position by a spring 106 will straighten those containers not oriented longitudinally on the conveyor 18 and those not at 90° to the direction of the conveyor. The cocked containers will strike the wheel 104 and will be deflected thereby against the side board 89 and will continue to move along the conveyor 18. Should the container be positioned at 90° with respect to the desired position of travel along the conveyor 18 the wheel 104 will be deflected out of the way and the container will pass. The corner of the container will then strike the wheel 97 and the opposite corner will ride onto the chain 99. The chain 99 will rapidly turn the container about the corner striking the wheel 97 and will orient the container along the path of the discharge conveyor.

In an operative example the plate 15 reciprocates from the separating device under a tier of containers 20 and back to the separating device every 10 seconds. The total lapsed travel time in making a cycle is approximately 6 seconds. The bar 72 will feed a tier of containers, disposed in four rows, along the plate 15 at a speed slower than that of the shortest separating conveyor, but will move the four rows of containers onto the separating conveyors in 10 seconds. The conveyor sections 81, 82, 83, and 84 move the containers linearly at 240 feet per minute. 200/ft./min.; 160 ft./min.; and 120 ft./min, respectively. The speed of the separating conveyor sections is preferably adjustable to give the device of the present invention greater flexibility for use with different sized containers. This can be accomplished by adjustable pulleys or other conventional means.

Having thus disclosed the invention with reference to a preferred embodiment, it will be appreciated that some modifications can be made in the disclosed structure without departing from the spirit or scope of the invention as defined in the appended claims.

What is claimed is:

1. A destacking device adapted for serially removing tiers of containers from a stack and placing said tiers in a separating apparatus, said destacking device comprising:
    a hoist for raising and lowering a stack of containers arranged with a plurality of containers in side-by-side order in a rectangular tier,
    a suction head positioned above said hoist in a fixed position, said suction head comprising a hood having a perforate plate and blower means for establishing subatmospheric pressure within said hood upon engagement of a tier of containers with said perforate plate of said hood,
    bar means disposed in a plane below said plate and about said hood, said bar means comprising a gate mounted adjacent said hood for reciprocation in a plane generally parallel to the path of said hoist, and at least one bar extending parallel to said gate and movable toward and away from said gate,
    means mounting said at least one bar for movement toward the path of said hoist for engaging a tier of containers positioned against said perforate plate of said suction head for crowding said containers together and holding the same against said gate,
    plate means movable along a path normal to and into and out of the path of said hoist and under said gate between a load position beneath a tier of containers disposed against said suction head for receiving said tier of boxes and a discharge position spaced from the path of said hoist, and
    drive means for raising said hoist, for energizing said suction head, for actuating said bar means to move the same toward a said tier, for lowering said hoist, for moving said plate means to said load position, for de-energizing said suction head and releasing said bars to place said containers on said plate means, and for moving said plate means transversely out of the path of said hoist to said discharge position.

2. A destacking device according to claim 1 wherein said bar means comprises two opposed bars positioned generally normal to said gate and said at least one bar, said opposed bars and said at least one bar being movable by motor means toward the path of said hoist to engage the containers about the edge of a tier.

3. A destacking device adapted for serially removing tiers of containers from a stack and placing said tiers in a separating apparatus, said destacking device comprising:
    a hoist for raising and lowering a stack of containers arranged with a plurality of containers in side-by-side order in a rectangular tier,
    a suction head positioned above said hoist in a fixed position, said suction head comprising a hood having a perforate plate and blower means for establishing a subatmospheric pressure within said hood upon engagement of a tier of containers with said perforate plate of said hood,
    plate means movable along a path normal to and into and out of the path of said hoist between a load position beneath a tier of containers disposed against said suction head for receiving said tier of boxes and a discharge position spaced from the path of said hoist,
    bar means disposed in a plane below said plate and about said hood, said bar means comprising a gate mounted for reciprocation in a plane parallel to the path of said hoist and toward and away from the path of said plate means, and three bars positioned about said suction head intermediate the space between said perforate plate and the path of said plate means, said three bars being movable toward the path of said hoist for engaging the exterior containers in a said tier and crowding them together, and
    drive means for raising said hoist, for energizing said suction head, for actuating said bar means to move the same toward a said tier, for lowering said hoist, for moving said plate means to said load position, for de-energizing said suction head and releasing said bars to place said containers on said plate means, and for moving said plate means transversely out of the path of said hoist to said discharge position.

4. A destacking device according to claim 3 wherein said plate means is movable away from the path of said hoist to said discharge position and said device further includes a separating means for separating the containers in said tier and placing the containers in a file.

* * * * *